United States Patent
Griffin

(10) Patent No.: US 6,902,759 B2
(45) Date of Patent: Jun. 7, 2005

(54) TECHNIQUE FOR COATING OR MARKING GLASS STRANDS

(75) Inventor: Stephen E. Griffin, Phoenix, AZ (US)

(73) Assignee: Innovaquartz Incorporated, Phoenix, AZ (US)

( * ) Notice: Subject to any disclaimer, the term of this patent is extended or adjusted under 35 U.S.C. 154(b) by 121 days.

(21) Appl. No.: 10/243,586

(22) Filed: Sep. 12, 2002

(65) Prior Publication Data

US 2004/0052940 A1 Mar. 18, 2004

(51) Int. Cl.[7] ................................. B05D 5/06

(52) U.S. Cl. .................. 427/166; 427/542; 427/554; 427/250

(58) Field of Search ................ 427/250, 542, 427/554, 166, 255.6

(56) References Cited

U.S. PATENT DOCUMENTS

| | | | | | |
|---|---|---|---|---|---|
| 3,798,589 | A | * | 3/1974 | Deardurff | 439/866 |
| 4,054,029 | A | * | 10/1977 | Sayles | 60/253 |
| 5,211,731 | A | * | 5/1993 | Busse et al. | 65/388 |
| 5,234,715 | A | * | 8/1993 | Stevens et al. | 427/250 |
| 5,294,387 | A | * | 3/1994 | Nakano et al. | 156/89.26 |

* cited by examiner

*Primary Examiner*—Bret Chen
(74) *Attorney, Agent, or Firm*—The Halvorson Law Firm

(57) ABSTRACT

A method for providing a metallic coating on glass strands or organically precoated glass strands comprising the steps of coating the glass strand (or organically precoated glass strand) with a metallorganic material, heating the metallorganically coated glass strand (or organically precoated glass strand) to a temperature sufficient to degrade the metallorganic material and drive off the organic portion thereby leaving a metallic coating behind, and cooling the now metal coated glass strand (or organically precoated glass strand) to a useful temperature.

18 Claims, No Drawings

TECHNIQUE FOR COATING OR MARKING GLASS STRANDS

FIELD OF THE INVENTION

This invention relates to a method for providing a metallic coating on vitreous fibers and organically coated vitreous fibers.

BACKGROUND OF THE INVENTION AND DESCRIPTION OF THE PRIOR ART

Metals are traditionally applied directly on drawn silica products using a melt of the metal. A small fork, akin to an old-fashioned inkwell pen, or other, similar device, directs or conducts the molten metal to form a bead at the tip, through which the drawn glass passes. In the case of aluminum (used on silica capillary and "specialty" optical fiber"), inert atmosphere is required and adhesion to the silica is rather good. In the case of gold (used on "specialty" optical fiber) adhesion is poor and the fiber is brittle near the ends where atmosphere infiltrates.

Metallization of polymers has also been reported, e.g., polyimides. Generally added as coordination complexes, simple anhydrous or hydrated salts (e.g., silver acetate) to the monomer mixtures prior to polymerization, most of the materials thus formed show unique properties of thermal conductivity, high temperature flexibility, and the like, but lack practicality for applications in drawn processes, due to the strict limitations on polymer "cure" conditions. Thus, there is a need for methods for applying films of gold, platinum, palladium and other metals by reduction of metal ions in organo-metallic compounds in solution to metals, directly on drawn silica, compatible with the conditions in silica draw, with good adhesion.

There is also a need for metal coatings over organic precoats, such as polyimide, which will find applications on silica capillary and fiber for extending use temperature ranges while retaining all of the ease-of-use qualities on plain, polyimide coated capillary. Coaxial electrical and thermal conduction may also find applications, e.g., in sensors.

Finally, metal coated fiber and capillary can be fixed in place with other metals, forming hermetic seals where polymer coated (alone) materials are insufficient.

SUMMARY OF THE INVENTION

It is an object of the present invention to provide a method for coating silica strand (optical fiber, rod or capillary) with a metallic coating, such at gold, silver, platinum, palladium and the like.

It is another object of the present invention to provide a method for coating an organically coated silica strand with a metallic coating, such at gold, silver, platinum, palladium and the like.

It is yet another object of the present invention to provide a method for marking silica strands and organically coated silica strands with metallic markings, such as rules and text information.

It is finally another object of the present invention to provide a method of coating or marking the lumen (bore) of a silica capillary strand.

The novel features that are considered characteristic of the invention are set forth with particularity in the appended claims. The invention itself, however, both as to its structure and its operation together with the additional objects and advantages thereof will best be understood from the following description of the preferred embodiment of the present invention. Unless specifically noted, it is intended that the words and phrases in the specification and claims be given the ordinary and accustomed meaning to those of ordinary skill in the applicable art or arts. If any other meaning is intended, the specification will specifically state that a special meaning is being applied to a word or phrase. Likewise, the use of the words "function" or "means" in the Description of Preferred Embodiments of the invention is not intended to indicate a desire to invoke the special provision of 35 U.S.C. §112, paragraph 6 to define the invention. To the contrary, if the provisions of 35 U.S.C. §112, paragraph 6, are sought to be invoked to define the invention(s), the claims will specifically state the phrases "means for" or "step for" and a function, without also reciting in such phrases any structure, material, or act in support of the function. Even when the claims recite a "means for" or "step for" performing a function, if they also recite any structure, material or acts in support of that means of step, then the intention is not to invoke the provisions of 35 U.S.C. §112, paragraph 6. Moreover, even if the provisions of 35 U.S.C. §112, paragraph 6, are invoked to define the inventions, it is intended that the inventions not be limited only to the specific structure, material or acts that are described in the preferred embodiments, but in addition, include any and all structures, materials or acts that perform the claimed function, along with any and all known or later-developed equivalent structures, materials or acts for performing the claimed function.

DESCRIPTION OF THE PREFERRED EMBODIMENT

The present is a technique that is useful for marking or coating glass capillary outer diameters or lumen, glass fibers and organically coated fibers and capillaries.

The technique according to the present invention uses a metallorganic material to "paint" or coat (or mark) strands, in the draw line, after the strand has been drawn in a draw tower. The coated strands are then heated to a temperature that is sufficient to degrade the metallorganic and drive off the organic portions, thereby leaving a metal coating behind. Preferably, the heating is performed in a draw tower after the strand has been drawn. Alternately, the strand may be premanufactured and coated and heated separately.

It is preferable that the heating of the metallorganic coated strand be done with an Infrared (IR) Heater, but it has been found that laser curing the metallorganic materials also works as does convective heating, in limited cases. When heating an organically precoated strand using an IR heater, it is most preferred to use an IR band in which the organic precoat does not substantially absorb. This helps ensure that the integrity of the organic precoat is not compromised during the "curing" process.

Not only can the body and ends of the strands be coated with metals, but the strands may be selectively marked, such as in precisely spaced bands, either by precise application of the "paint" or, more interestingly, by painting the entire section and "curing" with precise location of the laser focus. The uncured material is then either retained or washed away with solvent.

In one embodiment, a laser would be located in a draw tower, with the laser beam split to several spots spaced at regular intervals, such as 0.5 mm. The "paint" is applied on the bare glass and then either flash cured into lines or the laser is moved in step with the strand draw for slower cures. The marked strand is then passed through a solvent to remove the uncured material and coat the finished product with standard polymers. This could be done in intervals such as 5 cm to offer new rulings in reprocessed fiber. Finally, this manufacturing technique could be done continuously.

EXAMPLE

GC and CE dimensioned capillary was coated with gold containing metalorganic material during the draw manufacturing process. The coated capillary was placed in a furnace at 450° C. along with control fibers of the same material coated with only polyimide. After ½ hour, the uncoated polyimide failed, but the gold coated polyimide did not. Within about 8 hours, the uncoated polyimide samples (controls) were bare glass and the gold coated polyimide remained intact.

In this application, it appears that the gold blocks oxygen from the polyimide. While, polyimide can take very high temperatures in the absence of oxygen, it fails at about 375° C. in the presence of oxygen. In the petroleum industry, GC separations are done at temperatures that often exceed the upper continuous use temperature of the polyimide coating, e.g., 425° C., and capillary GC columns are essentially disposable as a result.

Thus, the metal coated silica strands manufactured according to the present invention can provide high temperature GC capillaries, high temperature optical fibers, and capillaries that are resistant to chemicals that normally would attack the underlying polyimide coating, such as strong acids and bases. Also, the gold may be soldered, so one can make simple hermetic seals on fiber and capillary. Further, one can transmit electricity down a fiber or capillary or establish a static electrical field around the fiber or capillary, which might lead to applications in sensors and perhaps even in CE related methods and biotechnology applications.

A possible application for this process is the manufacture a surgical fiber, particularly one using long wavelengths where gold is at least partially reflective and where the "bare" fiber is made visible in X-ray and in endocscopic procedures where saline flush is used. Currently, the fiber almost disappears in the aqueous environment, making placement of the tip very difficult. Rulings on the fiber tip would be useful to the surgeon in gauging the dimensions of target tissues, e.g., urinary calculi.

This method would be useful because normally the fiber or choice for such applications has a secondary (2°) Numerical Aperture (NA), due to the low index polymer coating on the Outside Diameter (OD) of fluorine doped glass cladding. In bending stresses, evanescent field energy leaks into the glass cladding, as cladding modes. When the bends become sharp enough to exceed the secondary NA, the polymer coating (2° cladding) burns and the fiber fails, often damaging costly endoscopic equipment, causing injury to the patient or even surgical personnel. While gold is not an excellent reflector until about 3 $\mu$m wavelength, it does reflect at 2.1 $\mu$m, so it should function as a reflective-type containment of the cladding modes.

Different metals used in the method according to the present invention include, but are not limited to, gold, silver, platinum, palladium, and the like, which would permit use of fiber (if directly coated on glass thickly enough) at up to 1000° C.

Finally, additional polymer coatings may be applied over the metallic coatings or markings in order to provide physical protection to the coated materials for handling and additional processing.

The preferred embodiment of the invention is described above in the Description of Preferred Embodiments. While these descriptions directly describe the above embodiments, it is understood that those skilled in the art may conceive modifications and/or variations to the specific embodiments shown and described herein. Any such modifications or variations that fall within the purview of this description are intended to be included therein as well. Unless specifically noted, it is the intention of the inventors that the words and phrases in the specification and claims be given the ordinary and accustomed meanings to those of ordinary skill in the applicable art(s). The foregoing description of a preferred embodiment and best mode of the invention known to the applicant at the time of filing the application has been presented and is intended for the purposes of illustration and description. It is not intended to be exhaustive or to limit the invention to the precise form disclosed, and many modifications and variations are possible in the light of the above teachings. The embodiment was chosen and described in order to best explain the principles of the invention and its practical application and to enable others skilled in the art to best utilize the invention in various embodiments and with various modifications as are suited to the particular use contemplated.

What is claimed is:

1. A method for metal coating a glass strand comprising the steps of coating at least one portion of the glass strand with a metallorganic material, heating the metallorganically coated glass strand to a temperature sufficient to degrade the metallorganic material and drive off the organic portion thereby leaving a thin metallic coating on the glass strand, and cooling the metal coated glass strand.

2. The method according to claim 1 wherein the glass strand is coated with an organic material prior to the step of coating with a metallorganic material.

3. The method according to claim 2 wherein the step of heating the metallorganically coated glass strand is accomplished using an infrared heater.

4. The method according to claim 3 wherein the metal in the metallorganic material is selected from the group consisting of gold, silver, platinum and palladium.

5. The method according to claim 4 wherein the metallorganic coats the entire strand.

6. The method according to claim 2 wherein the step of heating the metallorganically coated glass strand is accomplished using a laser light source.

7. The method according to claim 6 wherein the metal in the metallorganic material is selected from the group consisting of gold, silver, platinum and palladium.

8. The method according to claim 7 wherein the metallorganic coats the entire strand.

9. The method according to claim 2 wherein the metal in the metallorganic material is selected from the group consisting of gold, silver, platinum and palladium.

10. The method according to claim 9 wherein the metallorganic coats the entire strand.

11. The method according to claim 1 wherein the step of heating the metallorganically coated glass strand is accomplished using an infrared heater.

12. The method according to claim 11 wherein the metal in the metallorganic material is selected from the group consisting of gold, silver, platinum and palladium.

13. The method according to claim 12 wherein the metallorganic coats the entire strand.

14. The method according to claim 1 wherein the step of heating the metallorganically coated glass strand is accomplished using a laser light source.

15. The method according to claim 14 wherein the metal in the metallorganic material is selected from the group consisting of gold, silver, platinum and palladium.

16. The method according to claim 15 wherein the metallorganic coats the entire strand.

17. The method according to claim 1 wherein the metal in the metallorganic material is selected from the group consisting of gold, silver, platinum and palladium.

18. The method according to claim 17 wherein the metallorganic coats the entire strand.

* * * * *